G. W. COOPER.
Rotary Cultivator.

No. 80,604. Patented Aug. 4, 1868.

UNITED STATES PATENT OFFICE.

GEORGE W. COOPER, OF OGEECHEE, GEORGIA.

IMPROVEMENT IN RICE-CULTIVATORS.

Specification forming part of Letters Patent No. 80,604, dated August 4, 1868; antedated July 30, 1868.

*To all whom it may concern:*

Be it known that I, GEORGE W. COOPER, of Ogeechee, in the county of Scriven and State of Georgia, have invented a new and Improved Rice-Cultivator; and I do hereby declare that the following is a full, clear, and exact description thereof, which will enable those skilled in the art to make and use the same, reference being had to the accompanying drawings, forming part of this specification.

Figure 1:
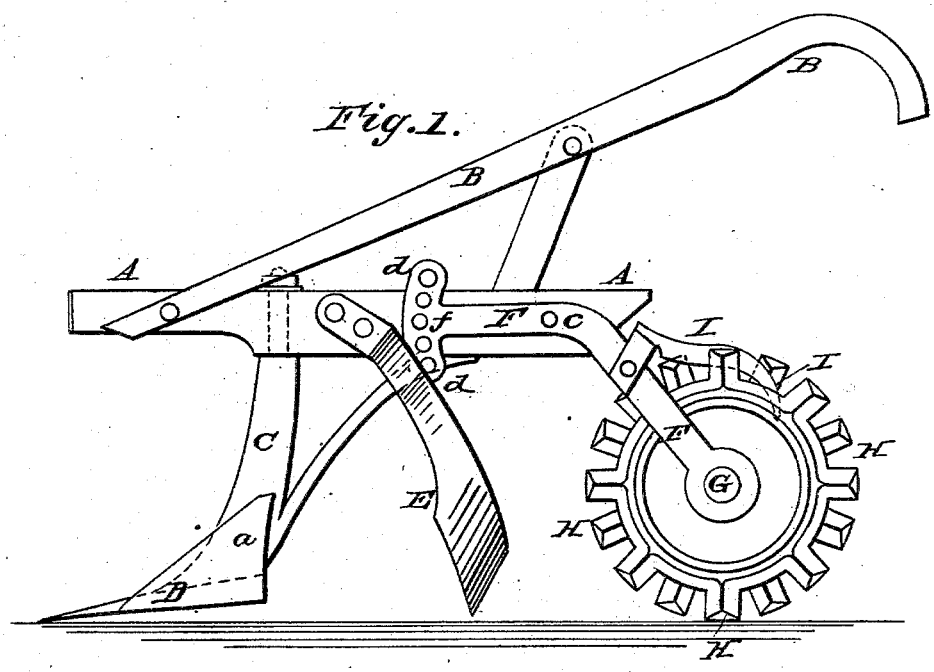
Figure 2:
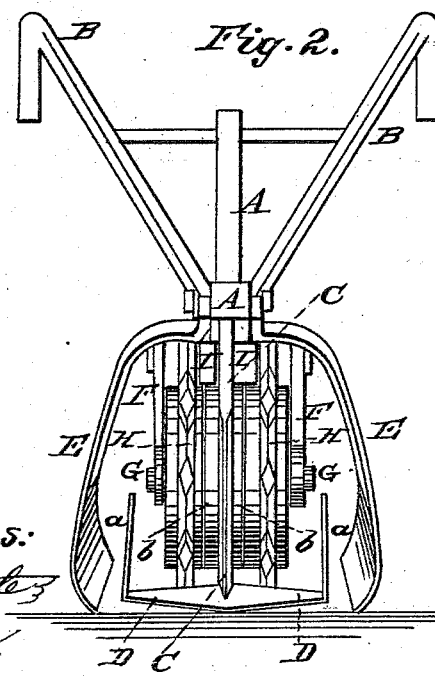

Figure 1 represents a side elevation of my improved cultivator. Fig. 2 is a front elevation of the same.

Similar letters of reference indicate corresponding parts.

This invention relates to a new rice-cultivator, by which the ground between the drills is broken up without throwing clods upon the plants and without forming furrows and hills between the drills.

The rice is planted in drills on perfectly level ground, and it is necessary to keep the ground loose, so that the tender roots of the plants may be able to work themselves through the same.

Rice-land is generally of a tough, clayey character, and it is therefore imperatively necessary to break the ground between the rows of plants; but such breaking of the ground should be done very carefully, so that the ground may remain perfectly level and even, and so that clods may not be thrown upon the plants.

The rice-cultivators heretofore used did not especially succeed in keeping the clods within the track of the apparatus, and many plants were destroyed by their use, as the plants are very slender, and are destroyed by the falling clods.

My invention consists in such an arrangement of the cutters, by which a portion of the ground is carefully separated from the remainder, and of the beaters, by which such separated portion of the ground is broken up, that the strip of ground acted upon will be kept strictly within its original bounds, and that the machine cannot become clogged—a general complaint against ordinary rice-cultivators.

A in the drawing represents the beam of my improved rice-cultivator. The same is of suitable size and material, and is provided with suitable handles, B B, for proper guidance. From the more forward part of the beam projects downward a suitably-braced foot, C, which carries a nearly horizontal cutter, D, which has upturned ends $a\ a$, as is clearly shown in Fig. 2.

Somewhat in rear of the cutter D are secured, to opposite sides of beam A, two curved arms, E, which have cutting-edges, and which are formed, as clearly shown in Fig. 2, so as to cut a wider strip of ground than the cutter D, and so as to have the tendency to throw such ground toward the middle under the beam.

From the rear end of the beam A project two arms, F, in which the bearings for a horizontal axle, G, are arranged. On this axle are mounted two or more toothed disks, H H, with beveled sharp edges all around the teeth and peripheries, as shown.

Between the disks are washers $b\ b$, of suitable diameters, as shown. I are scrapers projecting from the beam A or arms F, and resting with their ends upon the washers $b$, so as to keep the breakers between the disks free from dirt and from becoming clogged.

As the machine is drawn ahead the cutter D loosens a strip of earth and raises it a little, so as to separate it from the adjoining ground. The foot C cuts such loosened strip in two. The cutters E E then cut into the ground, as close to the rows of rice as possible, and lay the ground which they separate partly upon the strip already detached by the cutter D. Then the breakers H H move over the thus loosened ground and cut and break it up completely.

Owing to the sharp edges of the disks, the ground cannot adhere to them, and by the scrapers I it is kept from between them. The ground between the rows of plants will thus be fully broken up, but no clods will be thrown to the sides, which is mainly due to the shape of the cutters E and to that of the breakers H.

The arms F, to which the breakers are secured, are pivoted by a pin or pins, $c$, to the beam, and have at their end perforated or toothed arms $d$, which are also fastened to the beam by means of pins $f$. The height of the axle G can thus be regulated, and with it the weight of the breakers upon the ground.

Instead of having the set-holes in the plates F, they may as well be in the beam A with equal effect.

Having thus described my invention, I claim as new and desire to secure by Letters Patent—

1. The cutter D of a rice-cultivator, when arranged, as described, with upturned cutting sides *a a*, substantially as set forth.

2. The curved cutters E E, when arranged on the sides of the cultivator so as to cut close to the plants without injuring the same, as set forth.

3. The revolving toothed breakers H H, when arranged with beveled edges, and when made and operating substantially as herein shown and described.

4. The revolving breakers H H, when made as set forth, in combination with the washer *b* and cleaners I I, all made and operating substantially as herein shown and described.

5. Making the arms F, in which the axle G of the breakers has its bearings, adjustable on the beam A, so that thereby the height of the breakers can be adjusted, as set forth.

6. A rice-cultivator consisting of the beam or frame A, with the cutters D E E and breakers H H, all made and operating substantially as herein shown and described.

G. W. COOPER.

Witnesses:
  WM. F. McNAMARA,
  ALEX. F. ROBERTS.